United States Patent
Feng et al.

(10) Patent No.: US 12,216,379 B2
(45) Date of Patent: Feb. 4, 2025

(54) LIQUID CRYSTAL LENS, GOGGLES, ELECTRONIC PRODUCT, AND LIQUID CRYSTAL LENS DRIVING METHOD

(71) Applicant: CHENGDU YETA TECHNOLOGY CO., LTD., Chengdu (CN)

(72) Inventors: Wenbin Feng, Chengdu (CN); Zhiqiang Liu, Chengdu (CN); Bin Wang, Chengdu (CN)

(73) Assignee: CHENGDU YETA TECHNOLOGY CO., LTD., Chengdu (CN)

( * ) Notice: Subject to any disclaimer, the term of this patent is extended or adjusted under 35 U.S.C. 154(b) by 110 days.

(21) Appl. No.: 18/182,354

(22) Filed: Mar. 12, 2023

(65) Prior Publication Data
US 2023/0288775 A1 Sep. 14, 2023

(30) Foreign Application Priority Data
Mar. 14, 2022 (CN) .......................... 202210247667.6

(51) Int. Cl.
*G02F 1/29* (2006.01)
*G02C 7/08* (2006.01)
(52) U.S. Cl.
CPC ............. *G02F 1/294* (2021.01); *G02C 7/083* (2013.01)

(58) Field of Classification Search
CPC ............................... G02F 1/294; G02C 7/083
See application file for complete search history.

(56) References Cited

U.S. PATENT DOCUMENTS 6,191,881 B1 * 2/2001 Tajima ............. G02F 1/134309
359/254

* cited by examiner

*Primary Examiner* — Lucy P Chien
(74) *Attorney, Agent, or Firm* — Andrew C. Cheng

(57) ABSTRACT

A liquid crystal lens includes a liquid crystal layer, a first electrode layer, a second electrode layer, transparent substrates. The second electrode layer includes multiple electrode units arranged sequentially from a position adjacent to a center thereof r toward a position away from the center thereof. Each of the electrode units includes at least one conductive line which extends from a first position of the electrode unit to a second position of the electrode unit. A distance between the second position and the center of the second electrode layer is greater than a distance between the first position and the center of the second electrode layer. A spacing distance between adjacent conductive lines is less than or equal to 100 μm. A way of driving the liquid crystal lens is simple, and an ideal potential distribution can be obtained and not affected by change of characteristics of a high-resistance film.

19 Claims, 11 Drawing Sheets

LIQUID CRYSTAL LENS, GOGGLES, ELECTRONIC PRODUCT, AND LIQUID CRYSTAL LENS DRIVING METHOD

TECHNICAL FIELD

The present invention belongs to the technical field of liquid crystal lens, and specifically a liquid crystal lens, goggles, an electronic product, and a liquid crystal lens driving method.

BACKGROUND OF THE ART

In some scenarios of application, it is necessary to easily adjust the focal length of a lens. For example, a user suffering both myopia and presbyopia may need fast and easy switching between a focal length that corrects myopia and a focal length that corrects presbyopia. Further, for example, goggles or helmets of virtual reality (VR) and augmented reality (AR) are currently prevailing. Further, the diopter of myopia or presbyopia for different users may be different, and the users, once putting on the VR/AR goggles or helmet, must manually switch the lenses in order to clearly watch the images, this being extremely inconvenient.

Further, the types of VR/AR goggles or helmet visor that includes lens of optical power are limited, and thus, a myopia user has to wear both myopia eyeglasses and VR/AR goggles or helmet, and a hyperopia user has to wear both hyperopia eyeglasses and VR/AR goggles or helmet. And this causes severer stress to the users, and less comfort.

Existing liquid crystal lens have been proposed to serve as lenses, and such liquid crystal lenses use concentrical electrodes that are controlled independently to control the distribution of voltage, in order to control phase distribution. Such concentrical electrodes are supplied, through conductive lines, with a voltage externally, and the conductive lines are arranged on an electrode layer that is different from the concentrical electrode layer. Such a multilayered arrangement causes an increase of lens cost. Since the number of the externally supplied voltage signals is limited, the phase distribution of such a Fresnel lens has a very poor degree of smoothness. Thus, since multiple voltage sources are required, the driving method of the lens is complicated, and it is hard to have ideal phase distribution.

SUMMARY OF THE INVENTION

In view of the above, the present invention provides a liquid crystal lens, goggles, an electronic product, and a liquid crystal lens driving method to overcome the technical problems that adjusting the focal length of a lens in the prior art requires independently driving a large number of electrodes, and the control method being complicated.

The technical solution adopted in the present invention is as follows:

In a first aspect, the present invention provides a liquid crystal lens.

In a second aspect, the present invention provides goggles, which comprise the liquid crystal lens described in the first aspect.

In a third aspect, the present invention provides an electronic product, which comprises a control circuit and the liquid crystal lens described in the first aspect, and the control circuit is electrically connected to the liquid crystal lens.

In a fourth aspect, the present invention provides a liquid crystal lens driving method, which is applied to drive the liquid crystal lens described in the first aspect.

The advantageous effect is that the liquid crystal lens, the goggles, the electronic product, and the liquid crystal lens driving method according to the present invention imply electrode units that include conductive lines of which a spacing distance is less than or equal to 100 µm and are extended from a position close to a center of a second electrode layer toward a position away from the center of the second electrode layer, and that the electrode units arranged, in sequence, from the position close to the center of the second electrode layer toward the position away from the second electrode layer. With each of the electrode units including the conductive lines arranged in the previous way, each of the electrode units can accurately control the potential distribution corresponding to an annular zone and the potential corresponding to the annular zone varies in a smooth way. Since the multiple electrode units are arranged in sequence from the position close to the center of the second electrode layer toward the position away from the center of the second electrode layer, the annular zones to which the electrodes correspond are correspondingly arranged in a manner of being sequentially from the inside to outside from the center of the liquid crystal lens. Such annular zones jointly make a working region of the liquid crystal lens. The present invention requires only controlling, in an integrated manner, the first driving voltage and the second driving voltage applied to two ends of the conductive line of each of the electrode units to accurately control the potential distribution of the liquid crystal layer. The manner of control is simple, and the effect of the liquid crystal lens is significantly enhanced. Further, by adopting the previously discussed solution, the present invention can achieve accurate distribution of potential for the annular zones without a high-resistance film. The accuracy of control of the potential distribution is not affected by the unstable characteristics of the high-resistance film, and thus, the stability of the liquid crystal lens is higher.

BRIEF DESCRIPTION OF THE DRAWINGS

To more clearly illustrate the technical solutions presented in the embodiments of the present invention, the following provides a brief description to the drawings that are essential for the embodiments of the present invention. For those having ordinary skill in the field, other drawings can be contemplated from theses attached drawings without paying creative endeavor, and these are all within the scope of the protection of the present invention.

Figure 1:
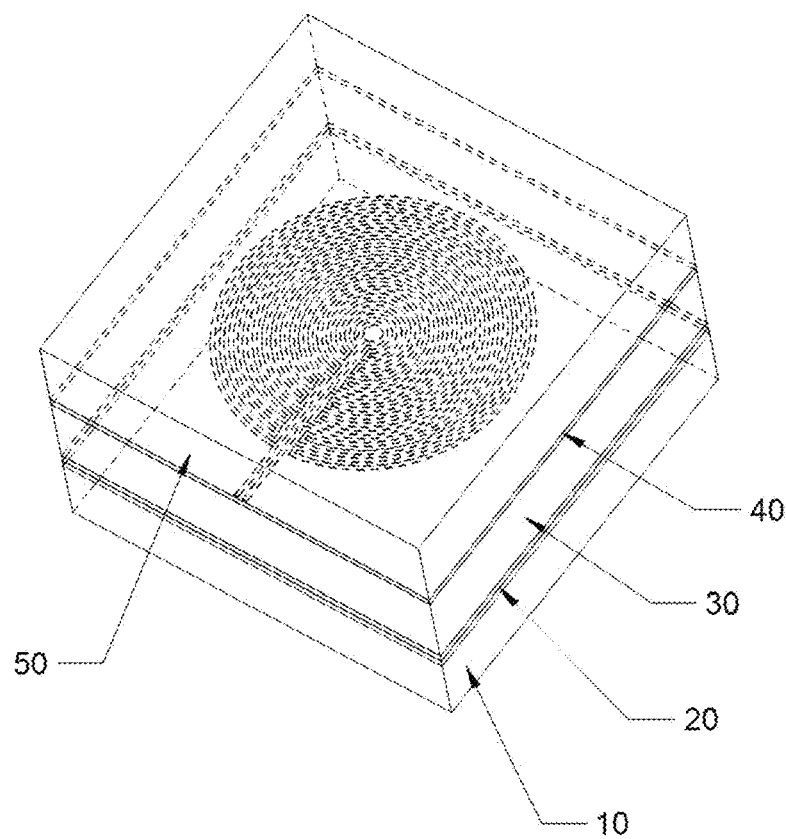
FIG. 1 is a schematic three-dimensional diagram of a liquid crystal lens according to the present invention.

DESCRIPTION OF REFERENCE SIGNS first transparent substrate 10, first electrode layer 20, liquid crystal layer 30, second electrode layer 40, electrode unit 430, first electrode unit 43-1, second electrode unit 43-2, third electrode unit 43-3, conductive line 431, outermost curved segment 4311, innermost curved segment 4312, intermediate curved segment 4313, connecting segment 4314, intermediate connection section 4321, concentric circular ring 4322, electrode lead set 4110, first electrode lead 411, second electrode lead 412, and second transparent substrate 50.

PREFERRED EMBODIMENTS OF THE INVENTION

Embodiment 1

As shown in FIG. 1, the instant embodiment provides a liquid crystal lens. The liquid crystal lens comprises a liquid crystal layer 30, a first electrode layer 20, a second electrode layer 40, a first transparent substrate 10, and a second transparent substrate 50. The first electrode layer 20 and the second electrode layer 40 are respectively arranged at two opposite sides of the liquid crystal layer 30. The first transparent substrate 10 is arranged at one side of the first electrode layer 20 that is opposite to the liquid crystal layer 30. The second transparent substrate 50 is arranged at one side of the second electrode layer 40 that is opposite to the liquid crystal layer 30.

In the instant embodiment, the liquid crystal lens can be made of a layered structure, and the first transparent substrate 10, the first electrode layer 20, the liquid crystal layer 30, the second electrode layer 40, and the second transparent substrate 50 are respectively arranged at different layers. The layers are arranged as being stacked in a light-transmitting direction of the liquid crystal lens, which is a normal direction of each of the layers. One way of such an arrangement may be referred to the illustration of FIG. 1. In FIG. 1, arranged from bottom to top in the light-transmitting direction of the liquid crystal lens are respectively the first transparent substrate, the first electrode layer 20, the liquid crystal layer 30, the second electrode layer 40, and the second transparent substrate 50. The first transparent substrate 10 and the second transparent substrate 50 are made of transparent materials that have a specific strength and stiffness, such as glass plates and plastic plates. The first substrate provides an effect of supporting the liquid crystal lens. The first transparent substrate 10 may function as a carrier for the first electrode layer 20, and the first electrode layer 20 can be coated on the first substrate. The second substrate also provides an effect of supporting and may serve as a carrier for the second electrode layer 40. The second electrode layer 40 can be coated on the second transparent substrate 50.

Figure 2:
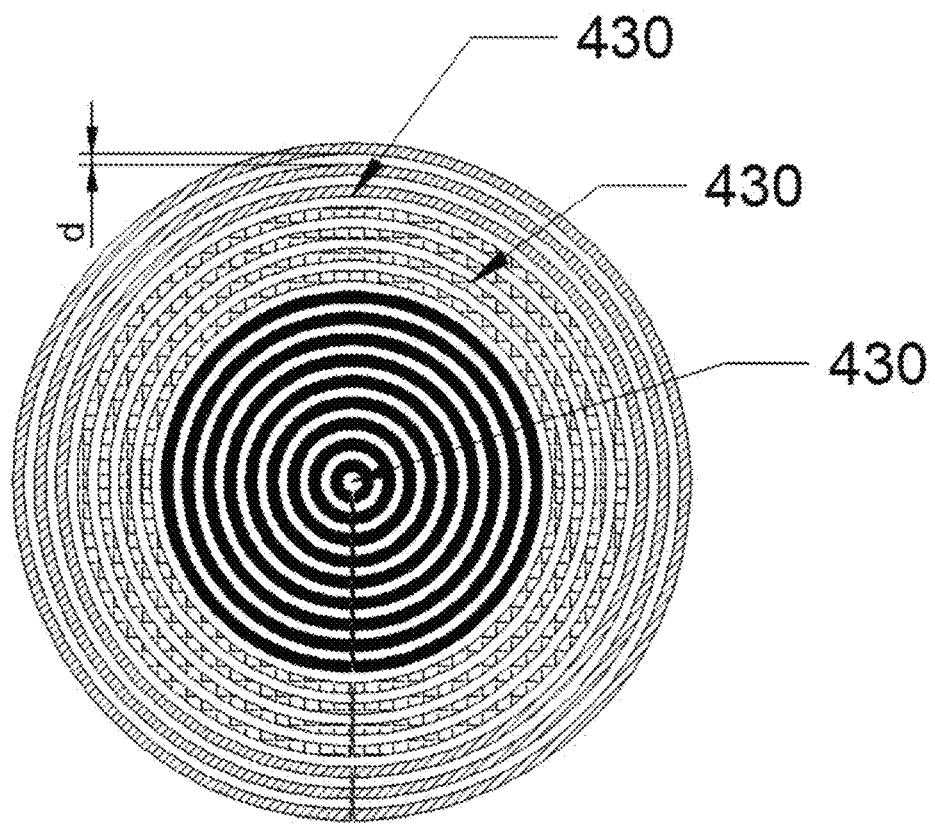
FIG. 2 is a schematic diagram of a second electrode layer in a first structure form according to the present invention.
Figure 5:
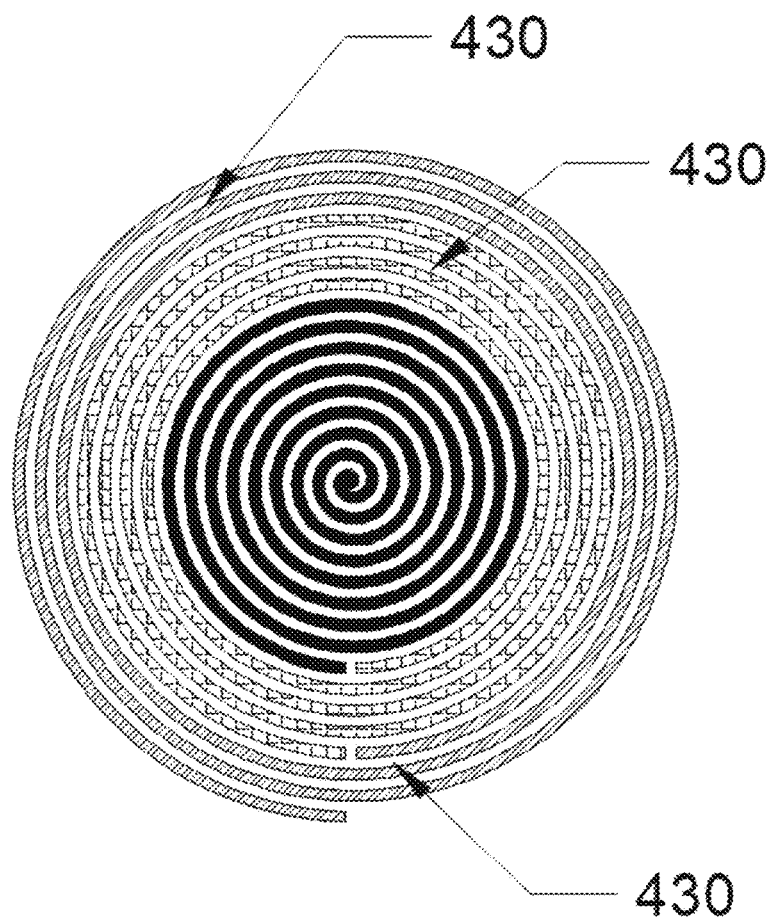
FIG. 5 is a schematic diagram of a second electrode layer in a second structure form according to the present invention.
Figure 9:
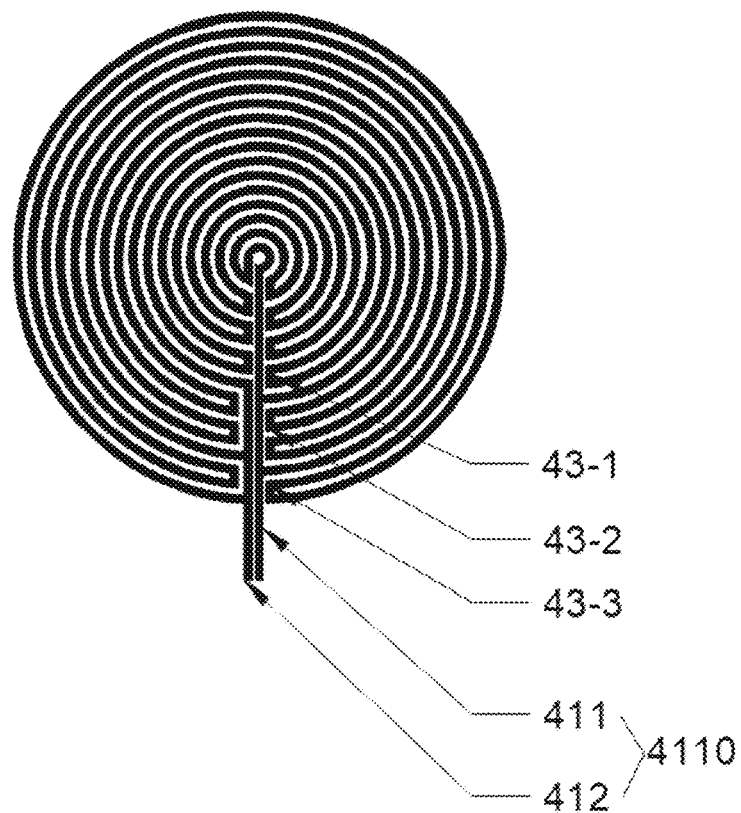
FIG. 9 is a schematic diagram of a second electrode layer in a third structure form according to the present invention.

As shown in FIGS. 2, 5, and 9, the second electrode layer 40 comprises multiple electrode units 430, and the multiple electrode units 430 are arranged sequentially from a position adjacent to a center of the second electrode layer 40 toward a position away from the center of the second electrode layer 40. Each of the electrode units 430 comprises at least one conductive line 431, and the conductive line 431 is extended, in a constrained manner, from a first position of the electrode unit 430 to a second position of the electrode unit 430. A distance between the second position and the center of the second electrode layer 40 is greater than a distance between the first position and the center of the second electrode layer 40. A spacing distance between adjacent conductive lines 431 is less than or equal to 100 μm. As shown in FIG. 2, the symbol "d" in the drawing indicates the spacing distance between adjacent conductive lines 431. In the instant embodiment, one end of the conductive line is driven by a first driving voltage, and another end opposite thereto is driven by a second driving voltage. The first position can be a position of the electrode unit 430 that is closest to the center of the second electrode layer 40, and the second position can be a position of the electrode unit 430 that is farther from the center of the second electrode layer 40.

Each of the electrode units 430 corresponds to an annular zone, and each of the electrode units 430 functions to control a potential distribution in the annular zone. Since the multiple electrode units 430 are arranged to sequentially distribute from the position adjacent to the center of the second electrode layer 40 toward the position away from the center of the second electrode layer 40, the annular zones respectively corresponding thereto are correspondingly distributed in sequence from the center of the liquid crystal lens toward the outside thereof, and such annular zones jointly form a working zone of the liquid crystal lens. In a specific way of implementation, one end of the conductive line 431 of each of the electrode units 430 is connected by means of an electrode lead to a power source that supplies the first driving voltage, such that the first driving voltage supplied from the power source is applicable through the electrode lead to the one end of the conductive line 431; and another end of the conductive line 431 is connected by an electrode lead to a power source that supplies the second driving voltage, such that the second driving voltage supplied from the power source is applicable through the electrode lead to said another end of the conductive line 431.

In the instant embodiment, the conductive line 431 having a predetermined resistance is extended gradually from the position where the electrode unit 430 is adjacent to the center of the second electrode layer 40 to the position where the electrode unit 430 is away from the center of the second electrode layer 40. The conductive line 431 has a length that is greater than a width and a thickness thereof, so that the conductive line 431 generally exhibits a form of a line strip. The number of the conductive line 431 can be just one, or more than one. In the instant embodiment, the first electrode layer 20 receives a common voltage, and for each of the electrode units 430, one end of the conductive line 431 receives the first driving voltage, and another end receives the second driving voltage.

Figure 4:
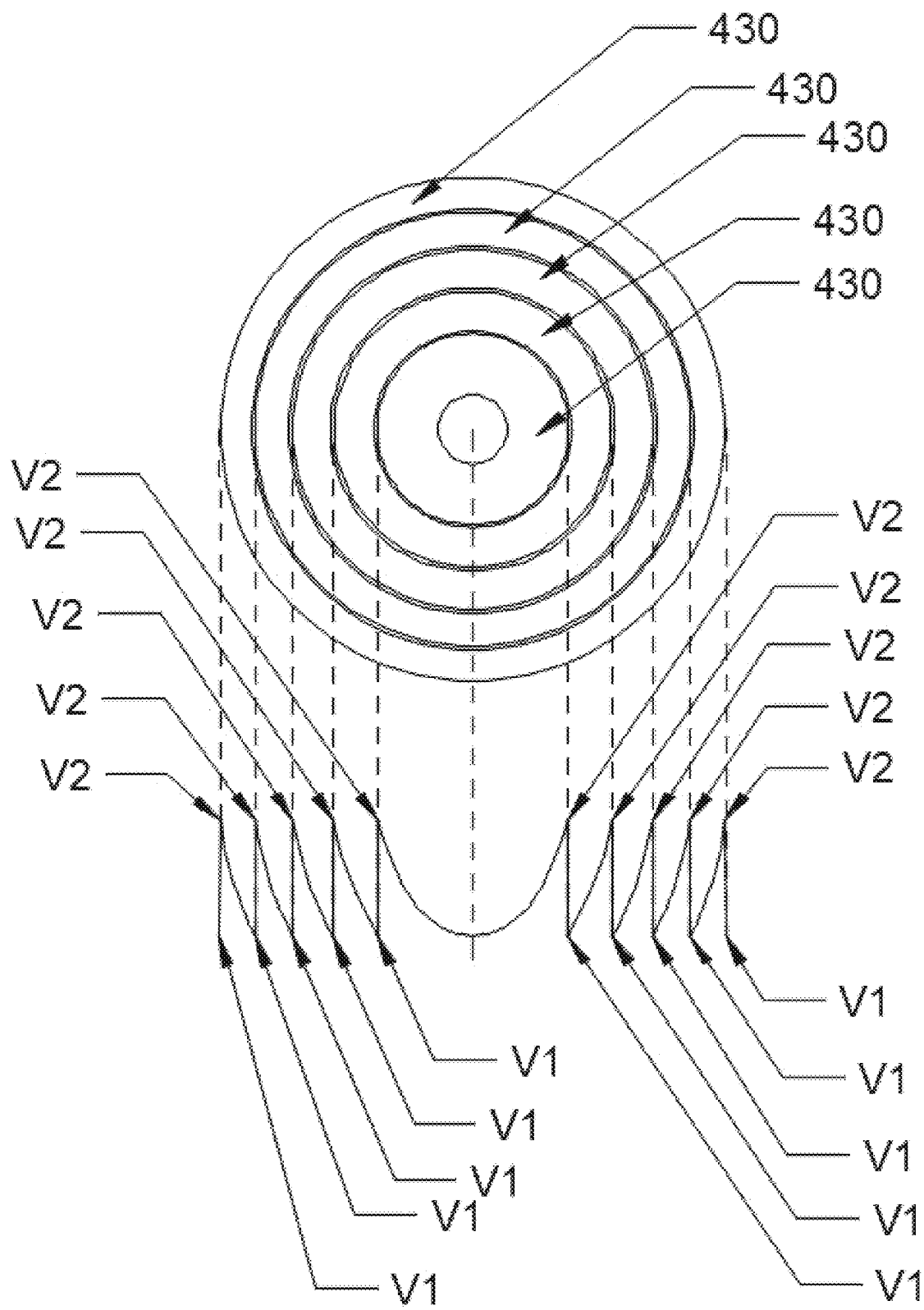
FIG. 4 is a schematic diagram of potential distribution of the liquid crystal lens according to the present invention in a radial direction.

As shown in FIG. 4, for a specific one of the electrode units 430, after the application of voltage as described above, since the conductive line 431 is arranged to have a predetermined length, the voltage on the conductive line 431 gradually varies with a lengthwise position along the conductive line 431. Further, the conductive line 431, in the course of extending from the first position to the second position, passes through every location of the annular zone from inside to outside, and thus, with the extension of the conductive line 431 from the first position toward the second position, the electrical potential in the space around the location where the conductive line 431 passes exhibits a gradient variation, and an electric field induced by the electrode unit 430 in the liquid crystal layer 30 also exhibits a gradient distribution in a radial direction. For example, the trend of variation of the electrical potential in the liquid crystal layer 30 within the annular zone corresponding to the electrode unit 430 in the radial direction can be an increase of the electrical potential from the first position to the second position, in which the electrical potential at the second position is maximum. Alternatively, for example, the trend of variation of the electrical potential in the liquid crystal layer 30 within the annular zone of the electrode unit 430 in the radial direction can be a decrease of the electrical potential from the first position to the second position, in which the electrical potential at the second position is minimum. The instant embodiment provides that for each of the electrode units 430, the potential distribution of the electrode unit 430 in the radial direction can be adjusted by means of a width thereof in the radial direction, and consequently, in the instant embodiment, the width of each of the electrode units 430 in the radial direction can be set as desired, and no constraint is imposed here. Since the liquid crystal director arrangement can be regulated through electrical control to exhibit different refractive index gradient distributions in a non-uniform electrical field, application of voltage of a predetermined gradient distribution can induce the liquid crystal director to form a non-uniform distribution, so as to make exiting light transmitting through the liquid crystal layer 30 developing a specific phase distribution, and thus, the instant embodiment provides that adjusting of the first driving voltage and the second driving voltage may adjust the potential distribution in the annular zone corresponding to each of the electrode units 430, so as to adjust the entire potential distribution of the liquid crystal lens to adjust the focal length of the liquid crystal lens.

Although the instant embodiment involves a number of conductive lines 431, yet it needs only two driving voltages to drive the liquid crystal lens to operate. Further, it only needs to adjust one of the two driving voltages, or both of them, to realize control of the optical power of the liquid crystal lens, without the need for independent control of each of the conductive lines. Thus, the control manner is relatively easy, and the required electrode leads are few, making the cost lower.

The instant embodiment provides that adjusting a shape of the conductive line 431 of each of the electrode units 430 can control the potential distribution of the annular zone corresponding to the electrode unit. To control the potential distribution in the annular zone corresponding to the electrode unit 430 in a more accurate way, it often adopts a solution of filling a high-resistance film or a high dielectric constant material around the conductive line 431. However, the high-resistance film and high dielectric constant material suffers characteristic instability, and thus, the high-resistance film or high dielectric constant material, although effective in improving the accuracy of controlling the potential distribution, does not guarantee stability. On the other hand, the instant embodiment provides a solution for realizing high accuracy potential distribution by setting the shape of the conductive line 431 and setting the spacing distance between the conductive lines 431 to be in a range within 100 μm so as to induce an ideal potential distribution in the corresponding annular zone without using a high-resistance film, and overcoming the influence on the effectiveness of the liquid crystal lens caused by the poor stability of the high-resistance film or the high dielectric constant material.

In 1882, a French physicist Augustin Jean Fresnel, according to the principle that imaging characteristics are determined by an optical surface curvature in optical imagery, proposed that in the design of an optical lens, the surface curvature could be kept fixed, while the surface thickness thereof might be reduced during fabrication, and a lens of such a design could induce an effect of convergence of light for converging the light incident on the surface thereof to a focal point. In machining and application of lenses, a spherical lens can be regarded as multiple non-continuous splits, with excessive parts among the splits being removed, yet during the course of machining, the original curvature of the surface is kept unchanged, and deflection of light is not affected. A Fresnel lens is designed and manufactured according such a principle, and the functionality of the multiple non-continuous splits mentioned above is achievable with a series of concentrical rings on the Fresnel lens. The instant embodiment also provides that an effect equivalent to a Fresnel lens can be realized with a liquid crystal lens, and for this, in the instant embodiment, the multiple electrode units 430 are arranged to make the liquid crystal in the liquid crystal layer 30 developing, under the application of the first driving voltage and the second driving voltage, a phase distribution that is equivalent to a Fresnel lens. Making the liquid crystal in the liquid crystal layer 30 developing a phase distribution equivalent to a Fresnel lens refers to that the phase distribution for light transmitting through the liquid crystal layer is identical to the phase distribution of light transmitting through a Fresnel lens.

As shown in FIG. 4, in which each of the electrode units 430 corresponds to one ring of the Fresnel lens, for any specific one of the electrode units 430, upon application of the first driving voltage and the second driving voltage, the specific electrode unit 430 generates an electric field that makes the liquid crystal in a corresponding area of the liquid crystal layer 30 forming a specific phase distribution. Such a specific phase distribution provides the liquid crystal layer 30 with an effect of light modulation that is equivalent to the effect of light modulation achieved with a corresponding Fresnel ring of the Fresnel lens. A combination of all the electrode units 430 is equivalent to a Fresnel lens in the entirety thereof. The instant embodiment provides that adjusting of the first driving voltage and the second driving voltage may adjust the focal length of the liquid crystal lens that is equivalent to a Fresnel lens. In the instant embodiment, the conductive line 431 of each of the electrode units 430 can be made of a transparent conductive material, and such a transparent conductive material includes, but not limited to, an indium titanium oxide (ITO) electrode, an indium zinc oxide WO) electrode, a fluorine-doped tin oxide (FTO) electrode, an aluminum zinc oxide (AZO) electrode, and an indium gallium zinc oxide (IGZO) electrode.

The instant embodiment also provides that varying a magnitude relationship of the first driving voltage and the second driving voltage applied to each of the electrode units 430 realizes switch of the optical power of the liquid crystal lens between positive and negative, so as to realize change of the liquid crystal lens from a negative lens to a positive lens or from a positive lens to a negative lens. For example, with the first driving voltage that is applied to an end of the conductive line 431 adjacent to the electrode center being made smaller than the second driving voltage that is applied to an end of the conductive line 431 far away from the electrode center, the liquid crystal lens of the instant embodiment shows characteristics of a convex lens, and under such a condition, spectacles made of the liquid crystal lens of the instant embodiment can be used as presbyopia eyeglasses; by changing the magnitude relationship between the first driving voltage and the second driving voltage to have the first driving voltage applied to the end of the conductive line 431 that is adjacent to the electrode center greater than the second driving voltage applied to the end of the conductive line 431 that is far from the electrode center, the liquid crystal lens of the instant embodiment exhibits the characteristics of a concave lens, and under such a condition, spectacles made of the liquid crystal lens of the instant embodiment can be used as myopia eyeglasses.

As one of such ways, when the number of the conductive lines 431 of one electrode unit 430 is greater than or equal to 2, the conductive lines 431 of the electrode unit 430 are of rotational symmetry about a center defined by a point of the second electrode layer 40. The rotational symmetry distribution referred to herein means the patterns formed of all the conductive lines 431, after rotating about a specific point of the second electrode layer 40 by an angle, the patterns formed by the newly set conductive lines 431 completely coincide the previous patterns. When the conductive lines 431 form rotational symmetry about a center defined by a point of the second electrode layer 40, the electrical potentials also form a distribution of rotational symmetry.

When the number of the conductive lines 431 is greater than or equal to 2, the electrode unit 430 further comprises a first connecting member and a second connecting member. The first connecting member functions to supply the same first driving voltage to the end of each of the conductive lines 431 connected thereto. The second connecting member functions to supply the same second driving voltage to the end of each of the conductive lines 431 connected thereto. As a preferred way of implementation, in the instant embodiment, the spacing distances between adjacent ones of the conductive lines 431 are identical. As another preferred way of implementation, in the instant embodiment, the width of every part of the conductive line 431 is made the same. Further, in the instant embodiment, when the spacing distance between adjacent ones of the conductive lines 431 is less than or equal to 100 μm, each of the electrode units 430 may include just one conductive line 431 to provide the ideal potential distribution.

Figure 3:
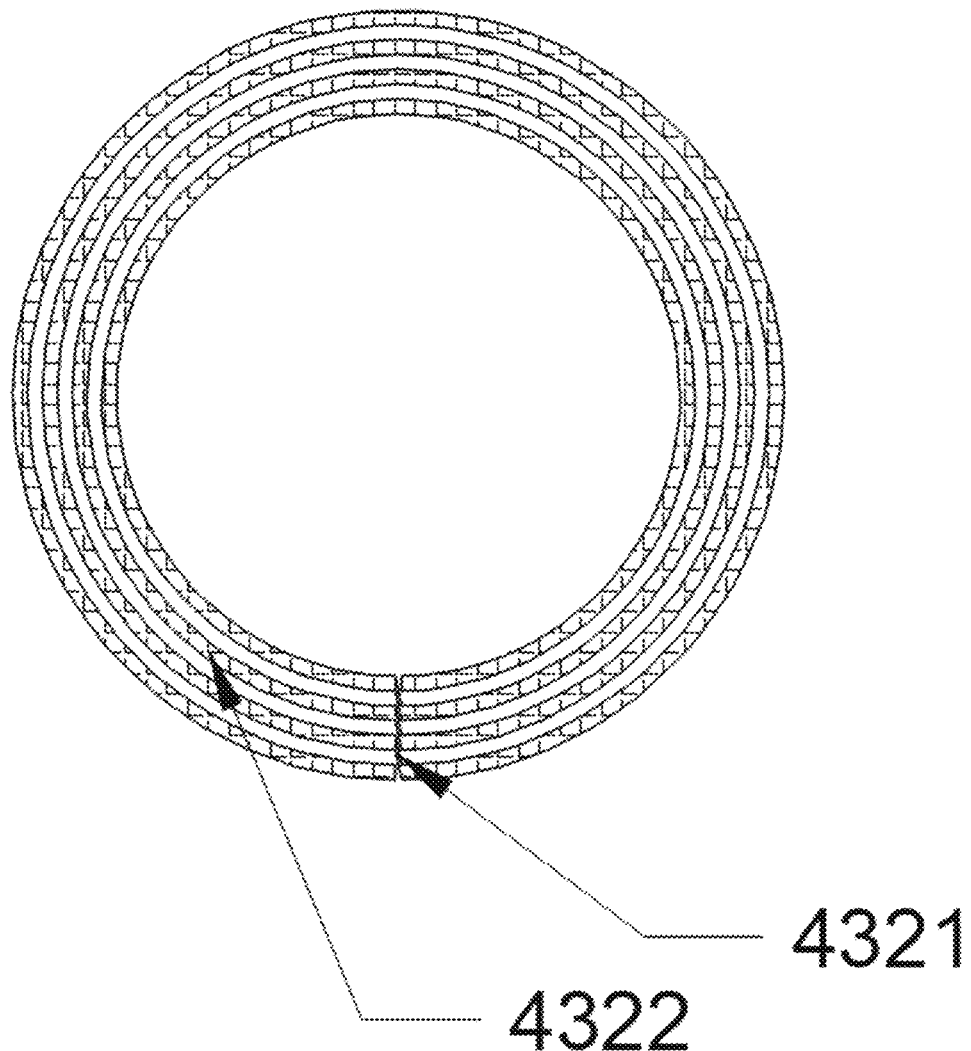
FIG. 3 is a schematic diagram of an electrode unit in the first structure form according to the present invention.

As one of the ways of implementation, when the number of the conductive line 431 of the electrode unit 430 is 1, the conductive line 431 comprises multiple intermediate connection sections 4321 and multiple concentric circular rings 4322. Adjacent ones of the concentric circular rings 4322 are connected by means of the intermediate connection sections 4321. As shown in FIGS. 2 and 3, for easy understanding, different hatching lines are used to indicate different ones of the electrode units 430, and for any specific one of the electrode units 430, the conductive line 431 is formed of a circle by a circle of the concentric circular rings 4322. The concentric circular rings 4322 are filled in the electrode unit 430 from inside to outside, and adjacent ones of the concentric circular rings 4322 are connected, in a starting end-to-terminating end manner, by the intermediate connection sections 4321 to form a complete configuration of the conductive line 431. With the previous arrangement, it is possible to connect, from the lower side, or the upper side, of the second electrode layer 40, the electrode lead that supplies the driving voltage to each of the electrode units 430.

In the instant embodiment, the conductive line of the electrode unit 430 is made of a regular structure of concentric circular ring, and no variation is made for the spacing distance between the conductive lines. Under the condition that the spacing distance between adjacent conductive lines is made constant, a potential distribution in a parabolic shape can be generated, and the structure has a reduced extent of complication, and thus the cost of fabrication is reduced.

Figure 6:
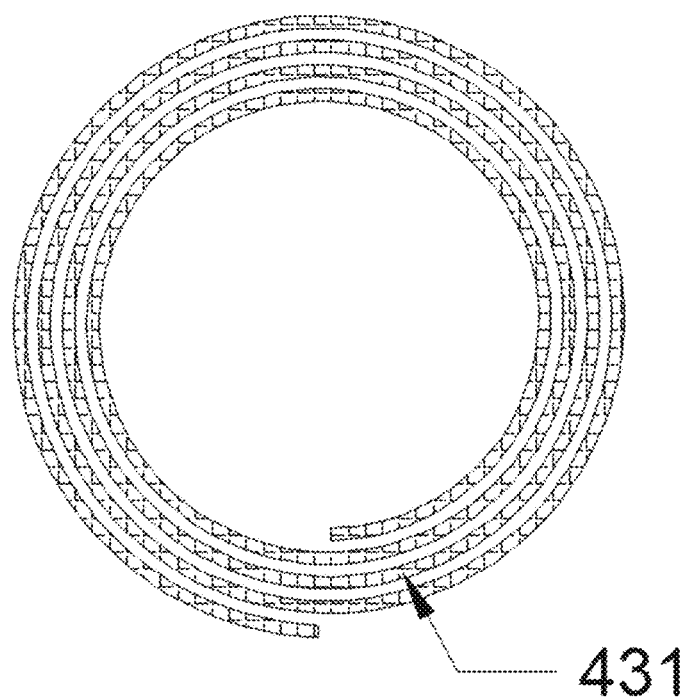
FIG. 6 is a schematic diagram of an electrode unit in the second structure form according to the present invention.

As shown in FIGS. 5 and 6, as one way of implementation, in the instant embodiment, the conductive line 431 has a shape of a spiral line. A starting point of the spiral line is the position of the electrode unit 430 that is closest to the center of the second electrode layer 40. The spiral line extends, from the starting point, in a circumferential direction toward an edge of the second electrode layer 40 in a circle by circle manner, and during the course of the spiral line extending from the center position of the second electrode layer 40 toward the edge position of the second electrode layer 40, the spiral line can fill up the most area of the electrode unit 430, and the electrical potential of the electrode unit 430 also gradually varies with the extension of the spiral line. Thus, under the condition that the spacing distance between adjacent conductive lines is less than or equal to 100 μm, a relatively ideal potential distribution can also be obtained.

Figure 7:
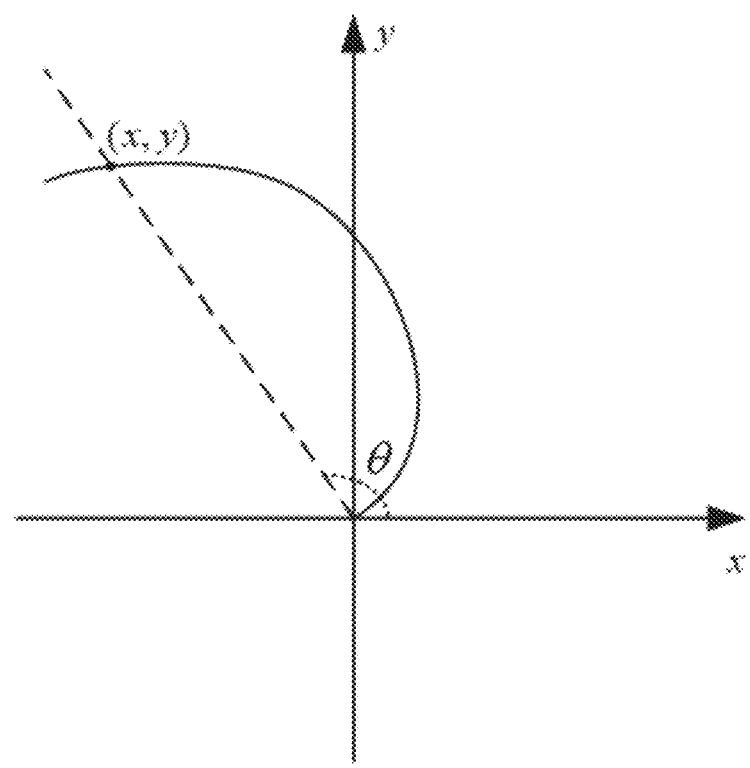
FIG. 7 is a schematic diagram showing a preferred curve according to the present invention.

In the instant embodiment, the liquid crystal lens can have a potential distribution that can accurately meet all requirements for functionality of the liquid crystal lens by setting the shape of the conductive line 431 A specific way of setting the shape of the conductive line 431 is as follows:

As shown in FIG. 7, in the instant embodiment, the shape of the conductive line 431 is a spiral line obtained with a first spiral line equation, and the first spiral line equation is as follows:

$$\begin{cases} x = r\cos(g(r)) \\ y = r\sin(g(r)) \end{cases}, \text{ where } g(r) = \pm\left(\sqrt{4a^2r^2 - 1} - \arctan\left(\sqrt{4a^2r^2 - 1}\right)\right)$$

where r indicates radius of polar coordinates; g(r) is polar angle; and a is parameter of the equation.

Figure 8:
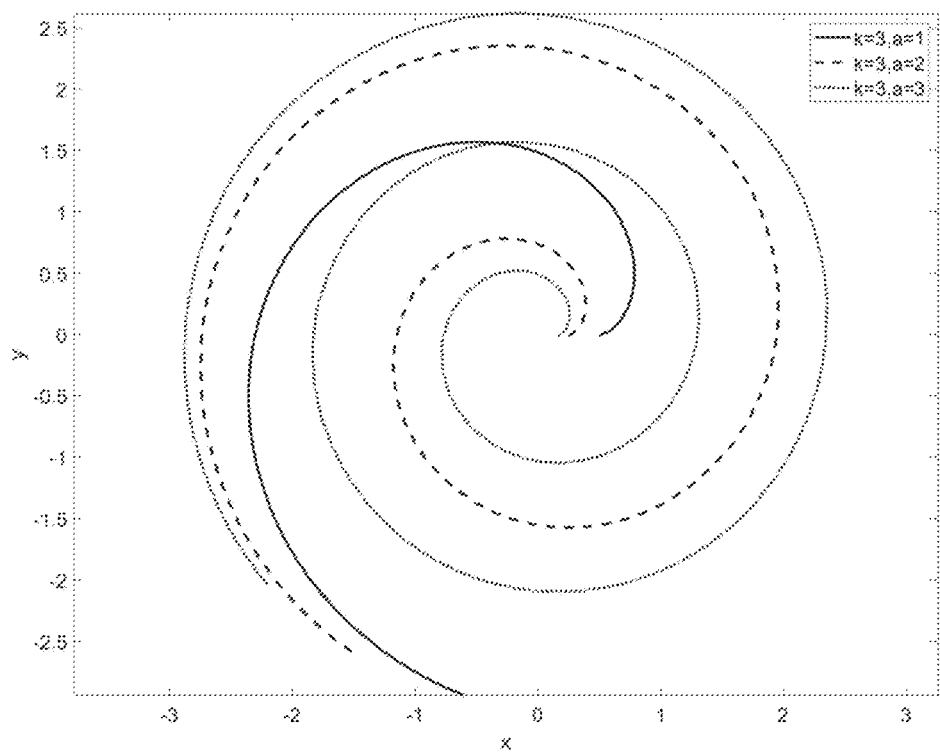
FIG. 8 is a schematic diagram showing preferred curves adopting different parameters according to the present invention.

As shown in FIG. 8, the size of a determines the density of the spiral line, and the greater a is, the denser the spiral line will be. The conductive line 431 set according to the previous way provides a potential accurately in a parabolic distribution to thereby provide a distribution of wavefront of the liquid crystal lens to be of accurate parabolic distribution.

In the instant embodiment, the shape of the conductive line 431 is a spiral line obtained with a second spiral line equation, and the second spiral line equation is as follows:

$$\begin{cases} x = r\cos(g(r)) \\ y = r\sin(g(r)) \end{cases}, \text{where } g(r) =$$

$$\pm \left( \arctan\left( \frac{\sqrt{R^2 - r^2}}{\sqrt{(m^2+1)r^2 - R^2}} \right) + \sqrt{m^2+1} \operatorname{arcsinh}\left( \frac{\sqrt{m^2+1}\sqrt{R^2-r^2}}{mR} \right) \right)$$

where r indicates radius of polar coordinates; g(r) is polar angle; in is parameter related to a material of the liquid crystal; and R is radius of curvature of lens.

By adopting the previous way to arrange the conductive line 431, potential that is in an accurate spherical distribution can be obtained, so that the wavefront distribution of the liquid crystal lens is also of an accurately spherical distribution. A lens with spherical wavefront shows the most ideal effect of imaging. An ordinary lens requires a complicated and delicate process for shaping in order to make a lens having a wavefront distribution that is close to spherical distribution, but the present invention can provide a lens with accurate spherical wavefront distribution by making the shape of the conductive line satisfying the previous requirement, and thus, without complicated processing, a lens having a high accuracy spherical wavefront distribution can be obtain, and the product fabrication cost can be greatly reduced.

The shape of the conductive line 431 is a spiral line obtained with the third spiral line equation. The third spiral line equation is as follows:

$$\begin{cases} x = r\cos(g(r)) \\ y = r\sin(g(r)) \end{cases}$$

where r indicates radius of polar coordinates; g(r) is polar angle; and $$g(r) = \pm \sqrt{a^2 - 1} \ln(r) + c$$

where c is an arbitrary constant, and a is a parameter of the equation.

By adopting the previous way to arrange the conductive line 431, potential that is in an accurate conic distribution can be obtained, so that the wavefront distribution of the liquid crystal lens is also of an accurately conic distribution.

As one of the ways of implementation, in the instant embodiment, the line shape of the electrode unit 430 is a parabolic line, and the mathematical equation of the shape is $$y = -\frac{1}{1250}x^2 + 2x \text{ (unit: μm)}.$$

As one of the ways of implementation, in the instant embodiment, the shape of the conductive line 431 is arc, and the mathematical equation of the shape is:

$$y = \sqrt{1250^2 - (x - 1250)^2} \text{ (unit: μm)}.$$

As one of the ways of implementation, in the instant embodiment, the shape of the conductive line 431 is an Archimedean spiral, and the mathematic equation of the shape is:

$$\begin{cases} x = 2500t\cos(2k\pi t) \\ y = 2500t\sin(2k\pi t) \\ \quad t \in [(0, 1] \end{cases}$$

where units of x and y are μm.

Archimedean spiral is an equidistant spiral, meaning the spiral line is expanded outward by an equal distance. In the spiral parameter equation, k indicates the period for the spiral line to expand from the center to the edge.

As one of the preferred ways of implementation, in the instant embodiment, the line shape of the electrode unit 430 is a Fermat's spiral, and the mathematic equation of the shape is:

$$\begin{cases} x = 2500\sqrt{t}\cos(2k\pi t) \\ y = 2500\sqrt{t}\sin(2k\pi t) \\ \quad t \in [(0, 1] \end{cases}$$

where units of x and y are μm.

Figure 10:
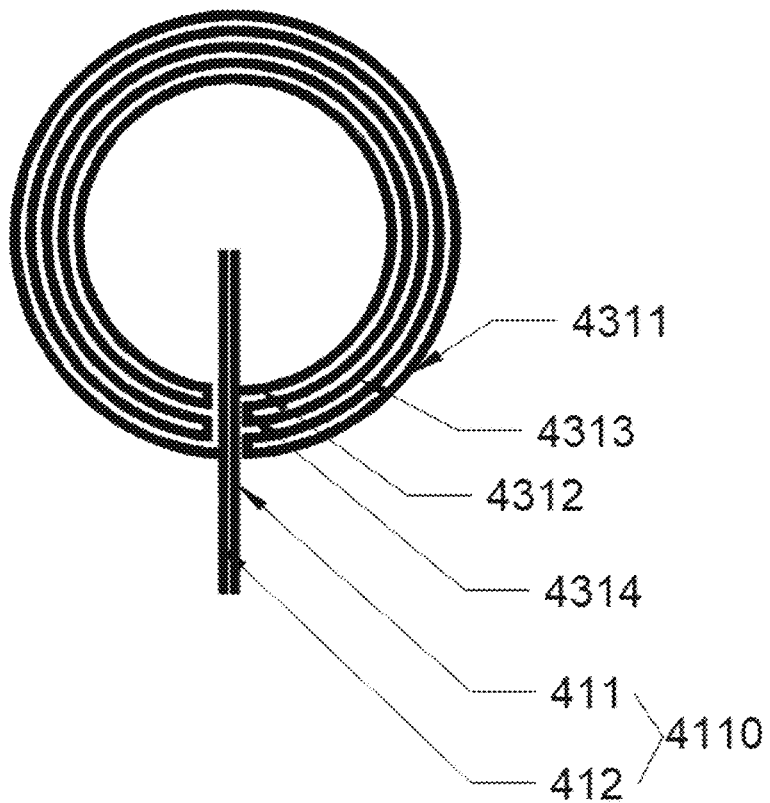
FIG. 10 is a schematic diagram of an electrode unit in the third structure form according to the present invention.

The Fermat's spiral is different from the Archimedean spiral in that with the outward expansion of the spiral line, the radius of the spiral line is increased nonlinearly, and the more outward expansion, the slower the increase of the radius of the spiral line. Referring to FIGS. 9 and 10, in FIG. 9, the second electrode layer includes three electrode units, which are respectively a first electrode unit 43-1, a second electrode unit 43-2, and a third electrode unit 43-3 from inside to outside.

In the instant embodiment, the second electrode layer 40 further comprises an electrode lead set 4110, and the electrode lead set 4110 comprises a first electrode lead 411 and a second electrode lead 412. The first electrode lead 411 is electrically connected to an end of the conductive line 431 of the electrode unit 430 that is close to the electrode center, and the second electrode lead 412 is electrically connected to an end of the conductive line 431 of the electrode unit 430 that is away from the electrode center. The first electrode line and the second electrode line are both extended from positions close to the center of the second electrode layer 40.

In the instant embodiment, the conductive line 431 of the electrode unit 430 comprises multiple curved segments arranged from inside to outside. In the instant embodiment, a conductive line 431 can be treated as being made up of multiple curved segments that are connected in a starting end-to-terminating end manner. Being arranged from inside to outside as mentioned above refers to a distribution in a radial direction of the liquid crystal lens from a position close to the center of the second electrode layer 40 toward a position away from the center of the second electrode layer 40. Being close to the center of the second electrode layer 40 is in an inward direction, while being away from the center of the second electrode layer 40 is in an outward direction. In the instant embodiment, each of the curved segments is broken open at the site of the electrode lead set 4110 in order to prevent contact with the electrode lead set 4110 or mutual interference. Each of the curved segments, as being broken open at the site of the electrode lead, forms two end portions, and the two end portions are respectively located at two sides of the electrode lead.

One end of the curved segment 4311 that is located outermost is electrically connected to the second electrode lead 412, and an opposite end is connected to an adjacent one of the curved segments at the same side of the electrode lead set 4110; one end of the curved segment 4312 that is located innermost is electrically connected to the first electrode lead 411, and an opposite end is connected to an adjacent segment of the curved segments at the same side of the electrode lead set 4110; and one end of the remaining curved segments is connected to an adjacent one of the curved segments at the same side of the electrode lead set 4110, and an opposite end is connected to another adjacent one of the curved segments at the same side of the electrode lead set 4110.

As shown in FIG. 10, among the multiple curved segments that make the conductive line 431, two curved segments are special, one being the outermost curved segment 4311 of the electrode unit 430, which is the curved segment of the electrode unit 430 that is furthest from the center of the second electrode layer 40. Another one is the innermost curved segment 4312, which is the curved segment of the electrode unit 430 that is furthest from the center of the second electrode layer 40. One end of the outermost curved segment 4311 is electrically connected to the second electrode lead 412, and an opposite end is electrically connected to a next curved segment (which is the curved segment that is closer to the center of the second electrode layer 40 in the radial direction). One end of the innermost curved segment 4312 is electrically connected to the first electrode lead 411, and an opposite end is connected to a previous curved segment (which is the curved segment that is further from the center of the second electrode layer 40 in the radial direction). Among all the curved segments that make up the conductive line 431, except the two curved segments discussed above, for the remaining ones of the curved segments, the two ends are connected the adjacent curved segments, and for easy description, these curved segments are also referred as the intermediate curved segments 4313 herein. One end of these intermediate curved segments 4313 is connected to a previous curved segment, while another end is connected to a next curved segment. As such, on the one hand, these curved segments are interconnected in a starting end-to-terminating end manner to continuously extend from a position of the electrode unit 430 that is close to the center of the second electrode layer 40 toward a position of an edge of the second electrode unit 430 and sufficiently fill up one conductive line 431 of the second electrode layer 40, and on the other hand, they avoid, in an ingenious manner, the electrode lead set 4110, to thereby accomplish accurate distribution of potential, while avoiding influence by the electrode lead set 4110. In the instant embodiment, a starting end and a terminating end of two adjacent ones of the curved segments are connected by a connecting segment 4314. In other words, one end of the connecting segment 4314 is connected to a previous one of the curved segments, while the other end connected to a next one of the curved segments. The first electrode lead 411 and the second electrode lead 412 can be straight lines, while each of the connecting segments 4314 can be a straight line parallel to the first electrode lead 411 or the second electrode lead 412.

Figure 18:
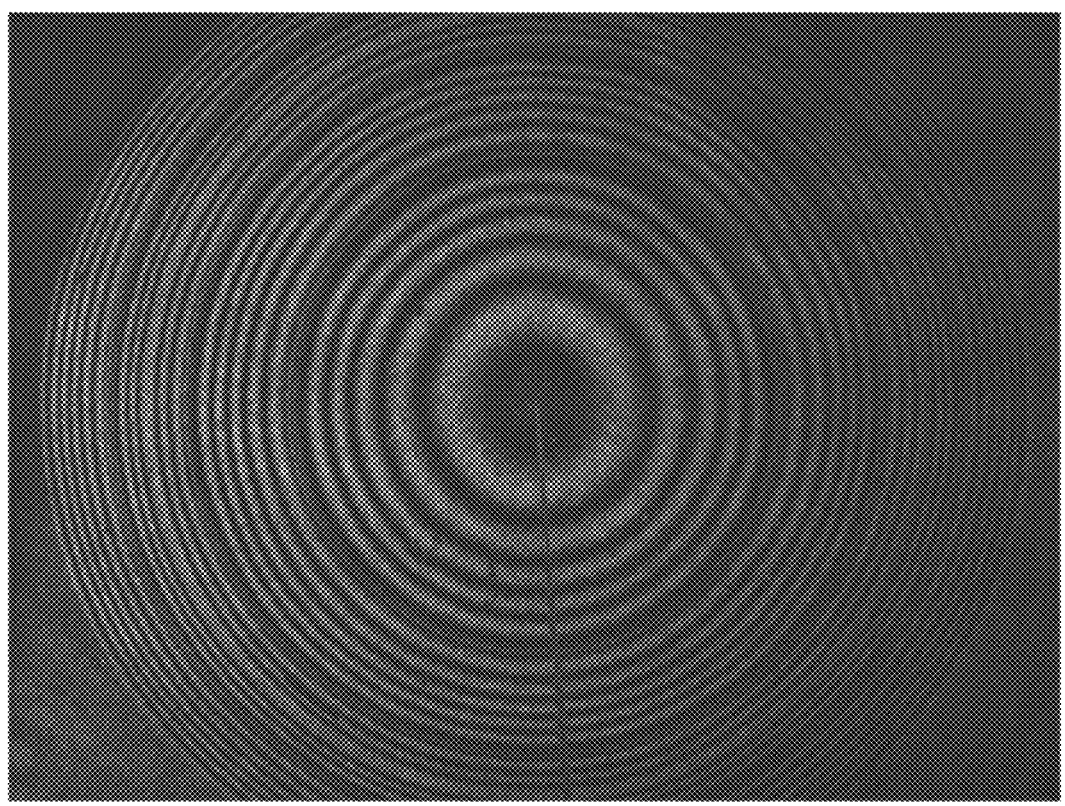
FIG. 18 is an interference pattern diagram of a Fresnel liquid crystal lens in a state of positive lens for the electrode unit of the present invention adopting a concentric ring structure.
Figure 19:
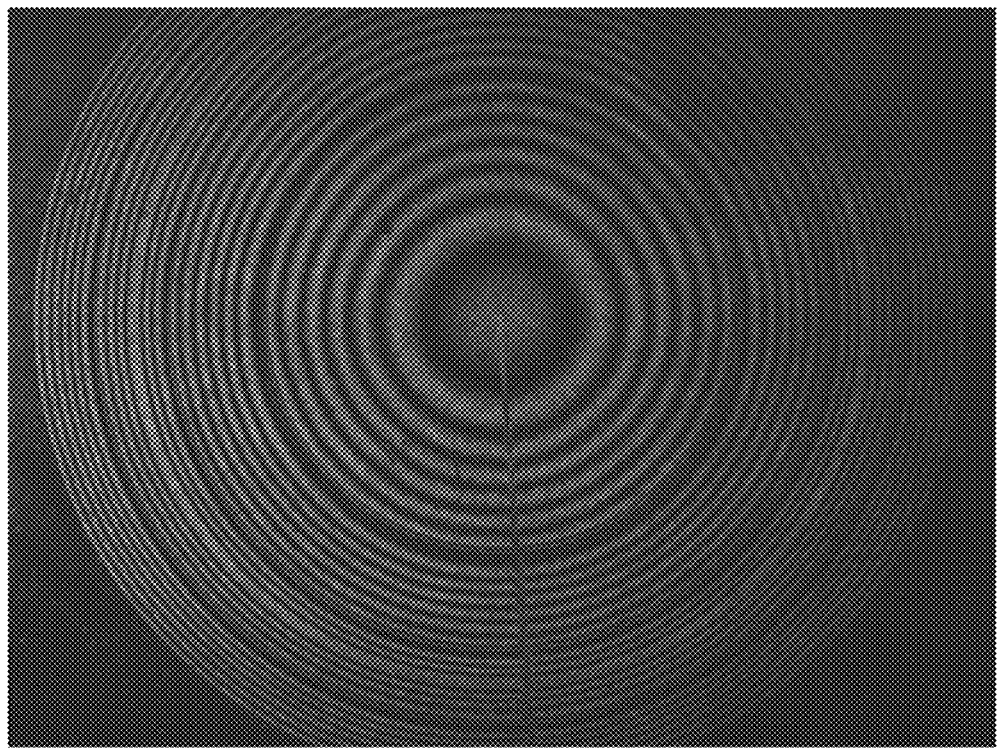
FIG. 19 is an interference pattern diagram of a Fresnel liquid crystal lens in a state of negative lens for the electrode unit of the present invention adopting a concentric ring structure.

As shown in FIG. 10, as a preferred way of implementation, in the instant embodiment, the curved segments are arcs, and the spacing distance between adjacent conductive lines is the same. By adopting the previous way, an accurate parabolic form of potential distribution can be obtained, and the fabrication cost is reduced as a simple structure form is used. The Fresnel liquid crystal lens using such a structure provides an effect that illustrated in FIGS. 18 and 19, wherein FIGS. 18 and 19 are respectively interference pattern diagrams of the liquid crystal lens operating as a positive lens and a negative lens, for individual ones of the curved segments are arcs, and it can be seen from the diagrams that the potential of the Fresnel liquid crystal lens having such a structure exhibits an excellent parabolic distribution.

As another way of implementation, in the instant embodiment, the spacing distance between at least some of the adjacent curved segments is not identical. The instant embodiment provides that the potential distribution of the electrode unit 430 can be controlled by setting the spacing distance between the curved segments, so as to control the effect of the liquid crystal lens for modulation of light.

Each spacing distance between adjacent ones of the curved segments satisfies the potential distribution formed in the liquid crystal lens being a spherical distribution. When each spacing distance of adjacent ones of the curved segments satisfies the above requirement, the wavefront distribution of the liquid crystal lens so obtained is spherical. A lens with spherical wavefront shows the most ideal effect of imaging. An ordinary lens requires a complicated and delicate process for shaping in order to make a lens having a wavefront distribution that is dose to spherical distribution, but the present invention can provide a lens with accurate spherical wavefront distribution by making the spacing distances between adjacent ones of the curved segments satisfying the previous requirement. Each spacing distance between adjacent ones of the curved segments satisfies the potential distribution formed in the liquid crystal lens being a conic distribution. When each spacing distance of adjacent ones of the curved segments satisfies the above requirement, the wavefront distribution of the liquid crystal lens so obtained is conic. As a preferred way, in the instant embodiment, a high-resistance film is arranged between the second electrode layer 40 and the liquid crystal layer 30. Different from an existing way of applying a high-resistance film to guide the potential distribution of the liquid crystal lens, the instant embodiment provides that the high-resistance film between adjacent conductive lines 431 is mainly for reducing variation of electric field in a space around the conductive lines 431. Since the spacing distance between adjacent conductive lines 431 is smaller than 100 μm, the potential distribution is mainly determined by the conductive lines 431, and thus, in the instant embodiment, the influence of the unstable characteristics of the high-resistance film on the potential distribution can be neglected.

Figures 13, 14:
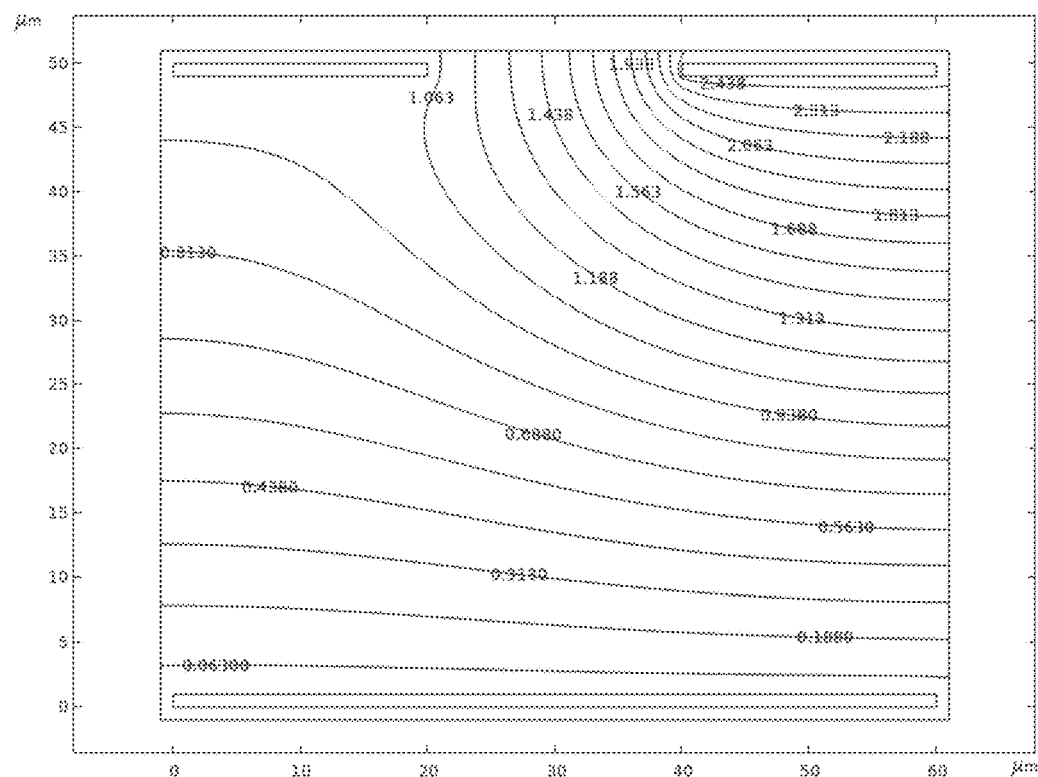
FIG. 13 is a potential distribution diagram for a location around a voltage interfacing site of two electrodes without introduction a third driving voltage with a conducting piece.
FIG. 14 is a schematic structure diagram of a conducting piece arranged at the interfacing site between two adjacent electrode units.

Further, it is also feasible to adopt such a way of arranging an insulation layer between the second electrode layer 40 and the liquid crystal layer 30, or arranging an insulation layer between the second electrode layer 40 and the liquid crystal layer 30, and arranging a high-resistance film between the insulation layer and the liquid crystal layer 30, to reduce the variation of electric field in space around the conductive lines 431. As shown in FIG. 13, since the voltage at an interfacing site between two adjacent electrode units changes from the first driving circuit to the second driving voltage, and thus, an abrupt change occurs on the voltage in the area, and thus, an electric field that is stronger than other areas is generated. Such an electric field affects the potential distribution in a certain range of the interfacing site thereby reducing the imaging quality of the liquid crystal lens. In view of this, as shown in FIG. 14, in the instant embodiment, the liquid crystal lens further comprises a conducting piece. A projection that the conducting piece casts on the second electrode layer is located on the interfacing site of the adjacent electrode unit. The conducting piece serves for receiving a third driving voltage.

Figure 15:
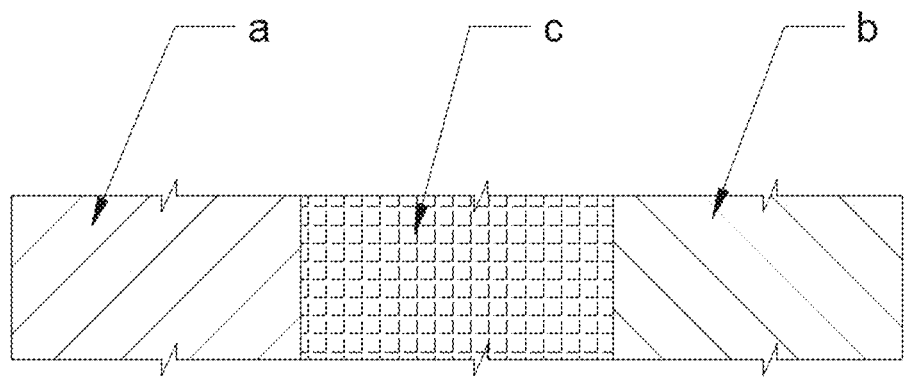
FIG. 15 is a partial enlarged diagram of the conducting piece arranged at the interfacing site of two adjacent electrode units.
Figure 16:
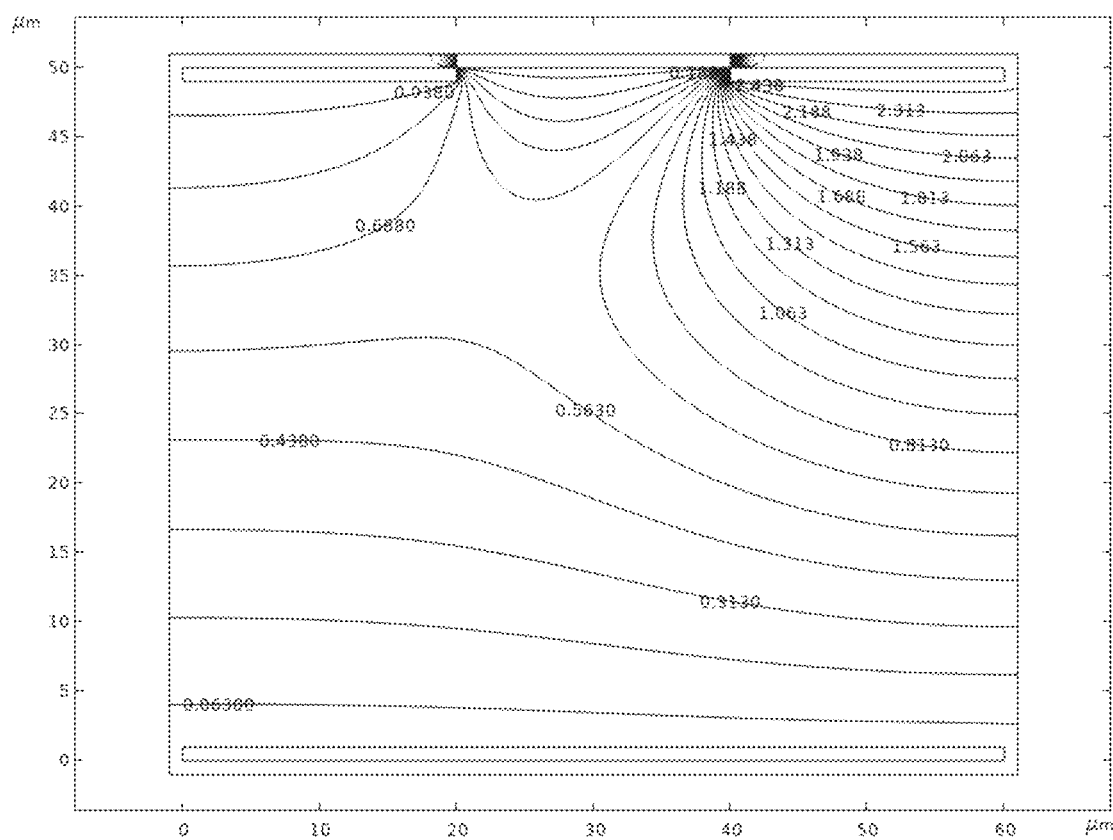
FIG. 16 is a potential distribution diagram for a location around the voltage interfacing site of two electrodes for the conducting piece being arranged at one side facing the second substrate and applied with a third driving voltage.
Figure 17:
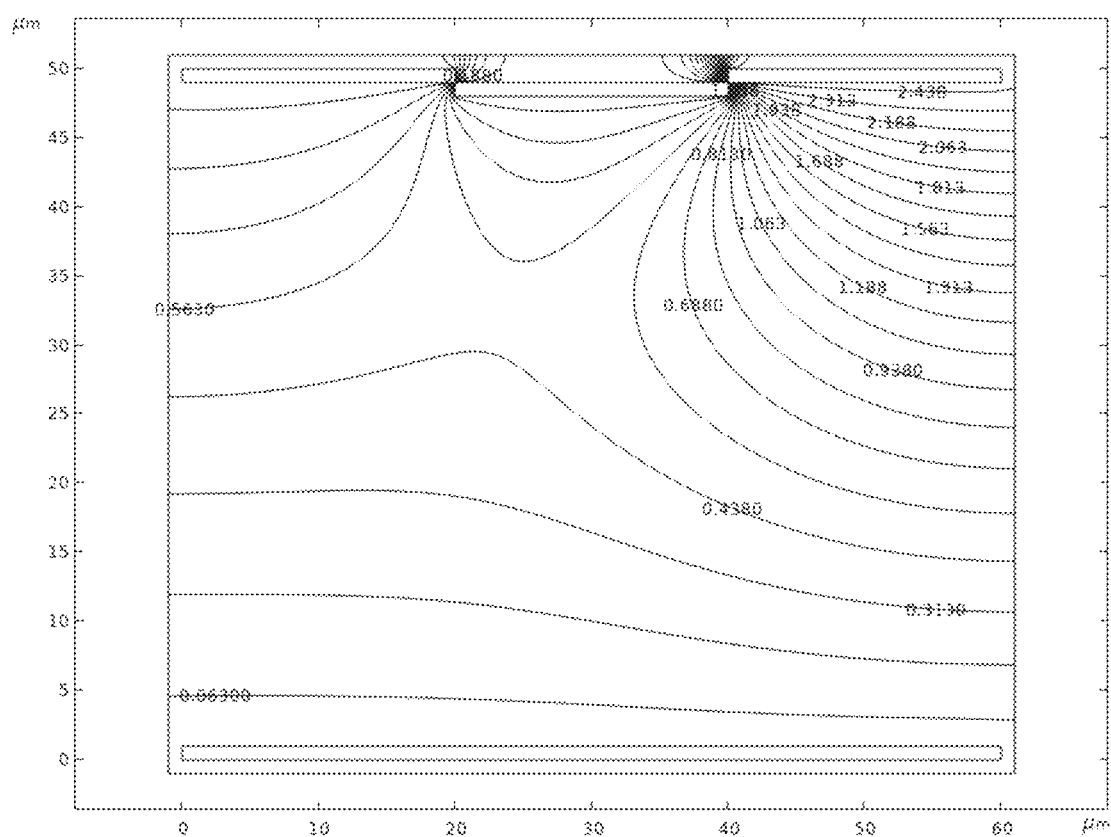
FIG. 17 is a potential distribution diagram for a location around the voltage interfacing site of two electrodes for the conducting piece being arranged at one side facing away from the second substrate and applied with a third driving voltage.

As shown in FIG. 15, FIG. 15 is a schematic view in an enlarged form showing a section taken from the ring of FIG. 14. In the drawings, a and b respectively indicate portions of the conductive lines of two adjacent electrode units that are adjacent to the other one. Since each of the electrode units is formed of conductive lines, and thus, the interfacing site of the adjacent electrode units comprises portions of the conductive lines of the two electrode units adjacent to the other one of the electrode units, and an area between the two adjacent portions, which are respectively portion a, portion b, and portion c between portion a and portion b. The projection cast by the conducting piece on the second electrode layer can be located between the two adjacent electrode units, or can partly cover the portions of the conductive lines of the two electrode units that are adjacent to the other electrode unit. The conducting piece can be located on one side of the second electrode layer that faces the second substrate, or can be located on one side of the second electrode layer that faces away from the second substrate. In the instant embodiment, an insulation layer is further arranged between the conducting piece and the second electrode layer. The instant embodiment uses the insulation layer to separate the conducting piece and the second electrode layer from each other to avoid mutual influence. As shown in FIGS. 16 and 17, by using the conducting piece to apply the third driving voltage V3, it is possible to reduce the range affected by a strong electric field at an interfacing site between two adjacent electrode unit, so as to enhance the imaging quality of the liquid crystal lens.

Embodiment 2

Figure 11:
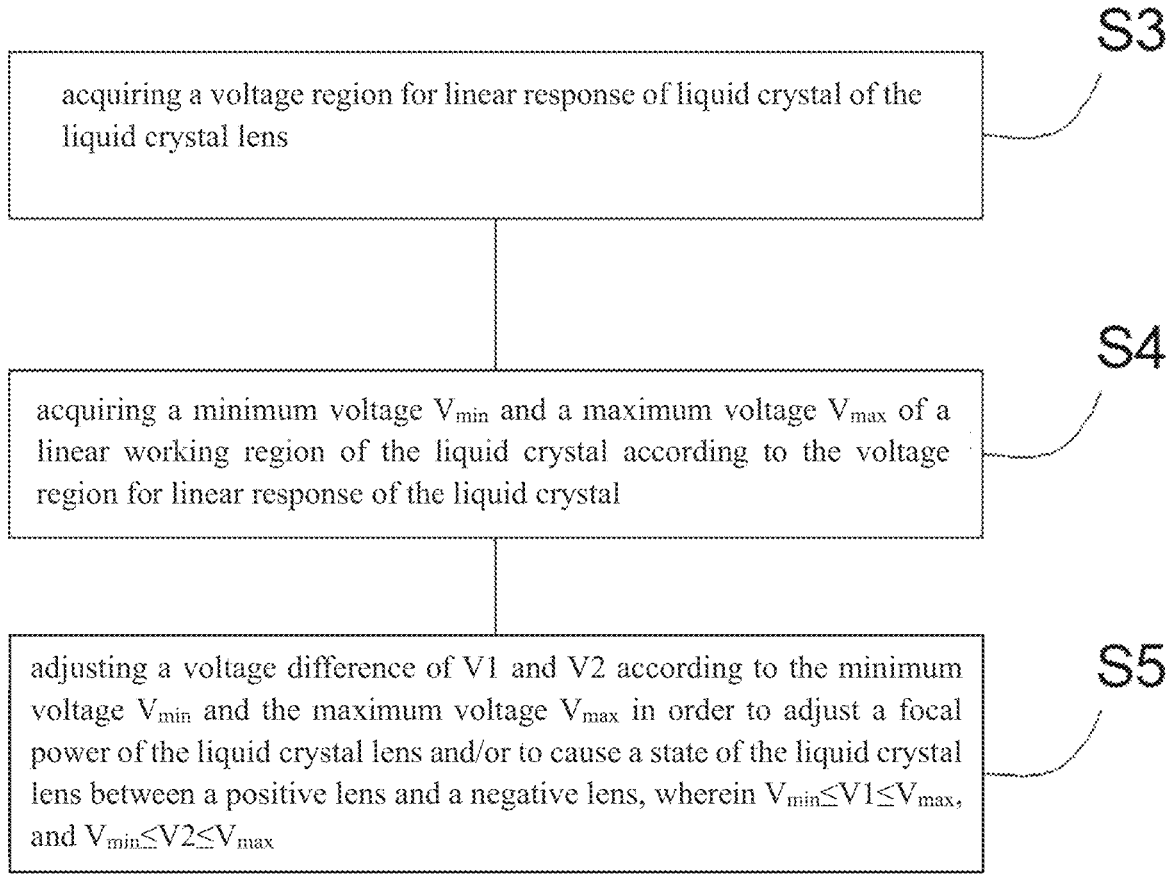
FIG. 11 is a flow chart illustrating a liquid crystal lens driving method according to the present invention.

The instant embodiment provides a liquid crystal lens driving method. The method is applied to drive the liquid crystal lens described in EMBODIMENT 1. Assuming a voltage applied between a first connecting member and the first electrode layer 20 is V1, and a voltage applied between a second connecting member and the first electrode layer 20 is V2, as shown in FIG. 11, the method comprises the following steps:

S1: acquiring a voltage region for linear response of liquid crystal of a liquid crystal lens;

wherein a linear working region of the liquid crystal refers to a voltage region in which a phase delay of the liquid crystal is of a linear relationship with respect to a driving voltage.

S2: acquiring a minimum voltage $V_{min}$ and a maximum voltage $V_{max}$ of a linear working region of the liquid crystal according to the voltage region for linear response of the liquid crystal;

S3: adjusting a voltage difference of V1 and V2 according to the minimum voltage Vmin and the maximum voltage Vmax in order to adjust an optical power of the liquid crystal lens, wherein Vmin≤V1≤Vmax, and Vmin≤V2≤Vmax.

The step adjusts the optical power of the liquid crystal lens by adjusting the value of V1-V2. A specific way of adjusting is that V1 is kept fixed, while the value of V2 is changed; or alternatively, V1 is kept fixed, while the value of V2 is changed; or alternatively, the values of V1 and V2 are both changed. In case that V1 is kept fixed, while the value of V2 is changed, it is feasible to set $V1=V_{min}$ or $V1=V_{max}$, while the value of V2 is adjusted; in case that V2 is kept fixed, while the value of V1 is changed, it is feasible to set $V2=V_{min}$ or $V2=V_{max}$, while the value of V1 is adjusted. Further, the instant embodiment further provides that a size relationship between V1 and V2 is changeable to switch the liquid crystal lens between states of positive lens and negative lens.

Embodiment 3

Figure 12:
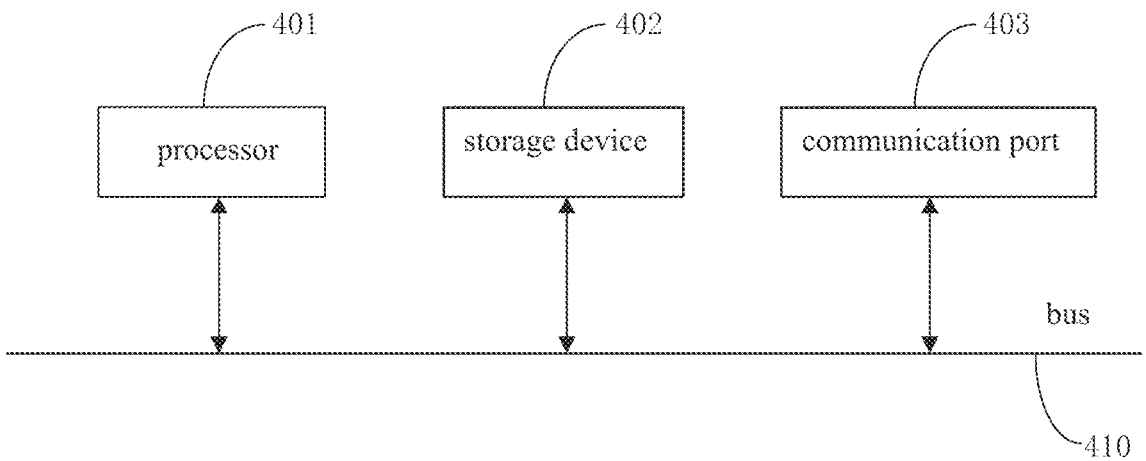
FIG. 12 a schematic structure diagram of a liquid crystal lens driving apparatus according to the present invention.

Further, referring further to FIG. 12, the liquid crystal lens driving method described in the previous embodiment of the present invention can be implemented with a liquid crystal lens driving apparatus according to the instant embodiment. FIG. 12 shows a schematic view of a hardware configuration of a liquid crystal lens driving apparatus provided in an embodiment of the present invention. The liquid crystal lens driving apparatus of the instant embodiment may comprises a processor 1 and a storage device 2 in which computer procedure instructions are stored.

Embodiment 4

Further, the liquid crystal lens driving method provided in the above embodiment can be implemented with a computer readable storage medium according to an embodiment of the present invention. The computer readable storage medium stores therein the computer procedure instructions. The computer procedure instructions, when executed by the processor, may perform any one of the liquid crystal lens driving methods described in the previous embodiment.

Embodiment 5

The instant embodiment provides a pair of goggles. The goggles comprise the liquid crystal lens described in EMBODIMENT 1. The goggles comprise a left-eye lens and a right-eye lens. The left-eye lens and the right-eye lens each include the liquid crystal lens according to EMBODIMENT 1. The goggles further comprise a control circuit. The control circuit comprises a first focusing circuit and a second focusing circuit. The first focusing circuit is electrically connected to the liquid crystal lens of the left-eye lens and functions to adjust the optical power of the liquid crystal lens of the left-eye lens. The second focusing circuit is electrically connected to the liquid crystal lens of the right-eye lens and functions to adjust the optical power of the liquid crystal lens of the right-eye lens.

Embodiment 6

The instant embodiment provides an electronic product. The electronic product comprises a control circuit and the liquid crystal lens according to EMBODIMENT 1. The control circuit is electrically connected to the liquid crystal lens. The electronic product comprises, but not limited to, an imaging device, a displaying device, a mobile phone, and a wearable device.

Embodiment 7

The instant embodiment provides an augmented reality (AR) device, which comprises the liquid crystal lens described in EMBODIMENT 1. Further, the AR device comprises a first lens assembly and a second lens assembly. The first lens assembly comprises at least one liquid crystal lens described in EMBODIMENT 1. The second lens assembly comprises at least one liquid crystal lens described in EMBODIMENT 1. The AR device further comprises a first focusing circuit and a second focusing circuit. The first focusing circuit is electrically connected to the liquid crystal lens of the first lens assembly, and the first focusing circuit functions to adjust the optical power of the liquid crystal lens of the first lens assembly. The second focusing circuit is electrically connected to the liquid crystal lens of the second lens assembly, and the second focusing circuit functions to adjust the optical power of the liquid crystal lens of the second lens assembly. In the instant embodiment, the first lens assembly corresponds to the left eye of a user, and the second lens assembly corresponds to the right eye of the user.

In the AR device, since the left eye and the right eye respectively correspond to different screens, two sets of lens assembly are provided to respectively correspond to the left eye and the right eye. Since the interpupillary distance between the two eyes is different for different users, if the focal length of the lens assembly is kept fixed, it might cause experience of some users wearing the AR goggles. Sine the facial configuration is different for different consumers, the AR goggles according to the instant embodiment use the liquid crystal lens of EMBODIMENT 1 to accomplish the function of focal length regulation. Setting the interpupillary distance and the focal length to reasonable positions would allow an image to be correctly fall on the retina, so as to provide the user with better experience.

Embodiment 8

The instant embodiment provides a virtual reality (VR) device, which comprises the liquid crystal lens described in EMBODIMENT 1. The VR device comprises a third lens assembly and a fourth lens assembly. The third lens assembly comprises at least one liquid crystal lens described in EMBODIMENT 1. The fourth lens assembly comprises at least one liquid crystal lens described in EMBODIMENT 1. The VR device further comprises a third focusing circuit and a fourth focusing circuit. The third focusing circuit is electrically connected to the liquid crystal lens of the third lens assembly, and the third focusing circuit functions to adjust the optical power of the liquid crystal lens of the third lens assembly. The fourth focusing circuit is electrically connected to the liquid crystal lens of the fourth lens assembly, and the fourth focusing circuit functions to adjust the optical power of the liquid crystal lens of the fourth lens assembly. In the instant embodiment, the third lens assembly corresponds to the left eye of a user, and the fourth lens assembly corresponds to the right eye of the user.

In the VR device, since the left eye and the right eye respectively correspond to different screens, two sets of lens assembly are provided to respectively correspond to the left eye and the right eye. Since the interpupillary distance between the two eyes is different for different users, if the focal length of the lens assembly is kept fixed, it might cause experience of some users wearing the VR goggles. Sine the facial configuration is different for different consumers, the VR goggles according to the instant embodiment use the liquid crystal lens of EMBODIMENT 1 to accomplish the function of focal length regulation. Setting the interpupillary distance and the focal length to reasonable positions would allow an image to be correctly fall on the retina, so as to provide the user with better experience.

The above provides a detailed description to the liquid crystal lens driving method, device, apparatus, and storage medium provided in embodiments of the present invention.

What is claimed is:

1. A liquid crystal lens, comprising a liquid crystal layer, a first electrode layer, a second electrode layer, a first transparent substrate, and a second transparent substrate, the first electrode layer and the second electrode layer being respectively arranged at two opposite sides of the liquid crystal layer, the first transparent substrate being arranged at one side of the first electrode layer that is opposite to the liquid crystal layer, the second transparent substrate being arranged at one side of the second electrode layer that is opposite to the liquid crystal layer;

the second electrode layer comprising multiple electrode units, the multiple electrode units being arranged sequentially from a position adjacent to a center of the second electrode layer toward a position away from the center of the second electrode layer, each of the electrode units comprising at least one conductive line, the conductive line being extended from a first position of the electrode unit to a second position of the electrode unit, a distance between the second position and the center of the second electrode layer being greater than a distance between the first position and the center of the second electrode layer, a spacing distance between adjacent conductive lines being less than or equal to 100 μm, the conductive line having an end driven by a first driving voltage and an opposite end driven by a second driving voltage, the spacing distances between adjacent ones of the conductive lines are identical, the width of every part of the conductive line is made the same, the electrode units comprise one conductive line, and the conductive line comprises multiple intermediate connection sections and multiple concentric circular rings, adjacent ones of the concentric circular rings being connected by means of the intermediate connection sections.

2. The liquid crystal lens according to claim 1, wherein the multiple electrode units are arranged to cause, under action of the first driving voltage and the second driving voltage, liquid crystal of the liquid crystal layer to form a phase distribution equivalent to a Fresnel lens.

3. The liquid crystal lens according to claim 1, further comprising an electrode lead set, the electrode lead set comprising a first electrode lead and a second electrode lead, the conductive line of the electrode units comprising multiple curved segments arranged from inside to outside, each of the curved segments being broken at a site of the electrode lead set, wherein one of the curved segments that is located outermost has one end electrically connected to the second electrode lead and an opposite end connected to an adjacent one of the curved segments at a same side of the electrode lead set, and wherein one of the curved segments that is located innermost has one end electrically connected to the first electrode lead and an opposite end connected to an adjacent one of the curved segments at a same side of the electrode lead set, remaining ones of the curved segments having one end connected to an adjacent one of the curved segments at a same side of the electrode lead set and an opposite end connected to another adjacent one of the curved segments at a same side of the electrode lead set.

4. The liquid crystal lens according to claim 3, wherein the curved segments are arcs, and the spacing distance between adjacent conductive lines is the same.

5. The liquid crystal lens according to claim 3, wherein the curved segments are arc, and the spacing distance between adjacent ones of at least a portion of the curved segments is different.

6. The liquid crystal lens according to claim 5, wherein each spacing distance between adjacent ones of the curved segments satisfies the potential distribution formed in the liquid crystal lens being a spherical distribution or a conic distribution.

7. The liquid crystal lens according to claim 1, wherein a shape of the conductive line is a spiral.

8. The liquid crystal lens according to claim 7, wherein the shape of the conductive line is a spiral line defined by a first spiral line equation, the first spiral line equation being as follows:

$$\begin{cases} x = r\cos(g(r)) \\ y = r\sin(g(r)) \end{cases}, \text{ where } g(r) = \pm\left(\sqrt{4a^2r^2 - 1} - \arctan\left(\sqrt{4a^2r^2 - 1}\right)\right)$$

where r indicates radius of polar coordinates; g(r) is polar angle; and a is an equation parameter.

9. The liquid crystal lens according to claim 7, wherein the shape of the conductive line is a spiral line defined by a second spiral line equation, the second spiral line equation being as follows:

$$\begin{cases} x = r\cos(g(r)) \\ y = r\sin(g(r)) \end{cases}$$

where $$g(r) = \pm\left(\arctan\left(\frac{\sqrt{R^2 - r^2}}{\sqrt{(m^2+1)r^2 - R^2}}\right) + \sqrt{m^2+1}\operatorname{arcsinh}\left(\frac{\sqrt{m^2+1}\sqrt{R^2-r^2}}{mR}\right)\right)$$

where r indicates radius of polar coordinates; g(r) is polar angle; m is a parameter related to a material of the liquid crystal; and R is a radius of curvature of the lens.

10. The liquid crystal lens according to claim 1, wherein a high-resistance film is arranged between the second electrode layer and the liquid crystal layer, or an insulation layer is arranged between the second electrode layer and the liquid crystal layer, or an insulation layer is arranged between the second electrode layer and the liquid crystal layer and a high-resistance film is arranged between the insulation layer and the liquid crystal layer.

11. The liquid crystal lens according to claim 1, wherein a line shape of the electrode unit is parabolic.

12. The liquid crystal lens according to claim 1, wherein the number of the conductive line of the electrode unit is greater than or equal to 2, and the conductive lines are arranged in rotational symmetry about a center defined by a point of the second electrode layer.

13. The liquid crystal lens according to claim 1, wherein the liquid crystal lens further comprises a conducting piece, and a projection that is cast by the conducting piece on the second electrode layer is located on an interfacing site between adjacent ones of the electrode units, the conducting piece receiving a third driving voltage.

14. Goggles comprising a frame and a lens, the lens being mounted on the frame, the lens comprising the liquid crystal lens, the liquid crystal lens comprising a liquid crystal layer, a first electrode layer, a second electrode layer, a first transparent substrate, and a second transparent substrate, the first electrode layer and the second electrode layer being respectively arranged at two opposite sides of the liquid crystal layer, the first transparent substrate being arranged at one side of the first electrode layer that is opposite to the liquid crystal layer, the second transparent substrate being arranged at one side of the second electrode layer that is opposite to the liquid crystal layer;

the second electrode layer comprising multiple electrode units, the multiple electrode units being arranged sequentially from a position adjacent to a center of the second electrode layer toward a position away from the center of the second electrode layer, each of the electrode units comprising at least one conductive line, the conductive line being extended from a first position of the electrode unit to a second position of the electrode unit, a distance between the second position and the center of the second electrode layer being greater than a distance between the first position and the center of the second electrode layer, a spacing distance between adjacent conductive lines being less than or equal to 100 μm, the conductive line having an end driven by a first driving voltage and an opposite end driven by a second driving voltage, the spacing distances between adjacent ones of the conductive lines are identical, the width of every part of the conductive line is made the same, the electrode units comprise one conductive line, and the conductive line comprises multiple intermediate connection sections and multiple concentric circular rings, adjacent ones of the concentric circular rings being connected by means of the intermediate connection sections.

15. The goggles according to claim 14, wherein the electrode units comprise one conductive line, and the conductive line comprises multiple intermediate connection sections and multiple concentric circular rings, adjacent ones of the concentric circular rings being connected by means of the intermediate connection sections.

16. An electronic product comprising a control circuit and the liquid crystal lens, the liquid crystal lens comprising a liquid crystal layer, a first electrode layer, a second electrode layer, a first transparent substrate, and a second transparent substrate, the first electrode layer and the second electrode layer being respectively arranged at two opposite sides of the liquid crystal layer, the first transparent substrate being arranged at one side of the first electrode layer that is opposite to the liquid crystal layer, the second transparent substrate being arranged at one side of the second electrode layer that is opposite to the liquid crystal layer; the second electrode layer comprising multiple electrode units, the multiple electrode units being arranged sequentially from a position adjacent to a center of the second electrode layer toward a position away from the center of the second electrode layer, each of the electrode units comprising at least one conductive line, the conductive line being extended from a first position of the electrode unit to a second position of the electrode unit, a distance between the second position and the center of the second electrode layer being greater than a distance between the first position and the center of the second electrode layer, a spacing distance between adjacent conductive lines being less than or equal to 100 μm, the conductive line having an end driven by a first driving voltage and an opposite end driven by a second driving voltage; the control circuit being electrically connected to the liquid crystal lens, the spacing distances between adjacent ones of the conductive lines are identical, the width of every part of the conductive line is made the same, the electrode units comprise one conductive line, and the conductive line comprises multiple intermediate connection sections and multiple concentric circular rings, adjacent ones of the concentric circular rings being connected by means of the intermediate connection sections.

17. The electronic product according to claim 16, wherein the electrode units comprise one conductive line, and the conductive line comprises multiple intermediate connection sections and multiple concentric circular rings, adjacent ones of the concentric circular rings being connected by means of the intermediate connection sections.

18. A liquid crystal lens driving method, being applicable to the liquid crystal lens which comprises a liquid crystal layer, a first electrode layer, a second electrode layer, a first transparent substrate, and a second transparent substrate, the first electrode layer and the second electrode layer being respectively arranged at two opposite sides of the liquid crystal layer, the first transparent substrate being arranged at one side of the first electrode layer that is opposite to the liquid crystal layer, the second transparent substrate being arranged at one side of the second electrode layer that is opposite to the liquid crystal layer; the second electrode layer comprising multiple electrode units, the multiple electrode units being arranged sequentially from a position adjacent to a center of the second electrode layer toward a position away from the center of the second electrode layer, each of the electrode units comprising at least one conductive line, the conductive line being extended from a first position of the electrode unit to a second position of the electrode unit, a distance between the second position and the center of the second electrode layer being greater than a distance between the first position and the center of the second electrode layer, a spacing distance between adjacent conductive lines being less than or equal to 100 μm, the conductive line having an end driven by a first driving voltage and an opposite end driven by a second driving voltage; defining a first driving voltage as V1 and a second driving voltage the voltage as V2, the spacing distances between adjacent ones of the conductive lines are identical, the width of every part of the conductive line is made the same, the electrode units comprise one conductive line, and the conductive line comprises multiple intermediate connection sections and multiple concentric circular rings, adjacent ones of the concentric circular rings being connected by means of the intermediate connection sections, the method comprising the following steps:

S1: acquiring a voltage region for linear response of liquid crystal of the liquid crystal lens;

S2: acquiring a minimum voltage $V_{min}$ and a maximum voltage $V_{max}$ of a linear working region of the liquid crystal according to the voltage region for linear response of the liquid crystal; and S3: adjusting a voltage difference of $V_1$ and $V_2$ according to the minimum voltage $V_{min}$ and the maximum voltage $V_{max}$ in order to adjust an optical power of the liquid crystal lens and/or to cause a state of the liquid crystal lens between a positive lens and a negative lens, wherein $V_{min} \leq V_1 \leq V_{max}$, and $V_{min} \leq V_2 \leq V_{max}$.

19. The liquid crystal lens driving method according to claim 18, wherein the electrode units comprise one conductive line, and the conductive line comprises multiple intermediate connection sections and multiple concentric circular rings, adjacent ones of the concentric circular rings being connected by means of the intermediate connection sections.

* * * * *